United States Patent
Chen et al.

(10) Patent No.: US 7,235,314 B2
(45) Date of Patent: Jun. 26, 2007

(54) INTER LAYERS FOR PERPENDICULAR RECORDING MEDIA

(75) Inventors: Qixu Chen, Milpitas, CA (US);
Chung-Hee Chang, Fremont, CA (US);
Li-Lien Lee, San Jose, CA (US);
Samuel D. Harkness, IV, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 339 days.

(21) Appl. No.: 10/797,111

(22) Filed: Mar. 11, 2004

(65) Prior Publication Data

US 2005/0202286 A1    Sep. 15, 2005

(51) Int. Cl.
*G11B 5/66*    (2006.01)
*G11B 5/70*    (2006.01)

(52) U.S. Cl. ..................................... 428/831
(58) Field of Classification Search ........... 428/828, 428/831, 831.2
See application file for complete search history.

(56) References Cited

U.S. PATENT DOCUMENTS

| | | | |
|---|---|---|---|
| 6,383,667 B1 | 5/2002 | Futamoto et al. | |
| 6,635,367 B2 | 10/2003 | Igarashi et al. | |
| 6,893,748 B2* | 5/2005 | Bertero et al. | 428/828.1 |
| 2002/0058160 A1 | 5/2002 | Oikawa et al. | |
| 2003/0017370 A1 | 1/2003 | Shimizu et al. | |
| 2003/0091868 A1 | 5/2003 | Shimizu et al. | |
| 2003/0099869 A1 | 5/2003 | Oikawa et al. | |
| 2003/0104250 A1 | 6/2003 | Shimizu et al. | |
| 2003/0152809 A1 | 8/2003 | Oikawa et al. | |
| 2003/0170500 A1 | 9/2003 | Shimizu et al. | |
| 2003/0180577 A1 | 9/2003 | Do et al. | |

OTHER PUBLICATIONS

Machine translation of JP 2001-283428, Toshiba Corp, Oct. 2001.*

* cited by examiner

*Primary Examiner*—Holly Rickman
(74) *Attorney, Agent, or Firm*—Darby & Darby (57) ABSTRACT

A magnetic recording medium, the order of layers in which is the substrate, the soft underlayer, the seedlayer, the $1^{st}$ $RuCr_x$-containing interlayer, the $2^{nd}$ $RuCr_x$-containing interlayer and the magnetic recording layer with preferably a oxides or nitrides-containing magnetic layer comprising grains, is disclosed. High-chromium ruthenium-chromium alloy used as inter layers significantly enhances coercivity and SMNR preferably due to the improved lattice match between RuCr inter layers and CoPt-based magnetic recording layers, and the surface energy of RuCr layers contributes to the performance improvement with the high-chromium addition into Ru inter layers.

13 Claims, 9 Drawing Sheets

Lubricant and Carbon Overcoat(s)
Magnetic Layer(s)
$2^{nd}$ Ru-containing interlayer(s) deposited under high Ar gas pressure
$1^{st}$ Ru-containing interlayer(s) deposited under low Ar gas pressure
Seed Layer(s)
$2^{nd}$ Soft Magnetic Layer(s)
Spacer Layer(s)
$1^{st}$ Soft Magnetic Layer(s)
Adhesion Enhancement Layer(s)
Substrate

Figure 1

| |
|---|
| Lubricant and Carbon Overcoat(s) |
| Magnetic Layer(s) |
| $2^{nd}$ Ru-containing interlayer(s) deposited under high Ar gas pressure |
| $1^{st}$ Ru-containing interlayer(s) deposited under low Ar gas pressure |
| Seed Layer(s) |
| $2^{nd}$ Soft Magnetic Layer(s) |
| Spacer Layer(s) |
| $1^{st}$ Soft Magnetic Layer(s) |
| Adhesion Enhancement Layer(s) |
| Substrate |

INTER LAYERS FOR PERPENDICULAR RECORDING MEDIA

RELATED APPLICATIONS

This application is related to application number, filed Sep. 17, 2003, entitled PERPENDICULAR MAGNETIC RECORDING MEDIA WITH IMPROVED CRYSTALLOGRAPHIC ORIENTATIONS AND METHOD OF MANUFACTURING SAME, and an application number, filed Nov. 3, 2003, entitled MAGNETIC MATERIAL FOR NON-REACTIVE PROCESS OF GRANULAR PERPENDICULAR RECORDING APPLICATION, having U.S. Ser. Nos. 10/663,670 and 10/698,385, respectively, which are hereby incorporated by reference.

FIELD OF INVENTION

This invention relates to magnetic recording media, such as thin film magnetic recording disks, and to a method of manufacturing the media. The invention has particular applicability to high areal density perpendicular magnetic recording media having very low medium noise and high degree of thermal stability, and more particularly, to a laminated medium with inter layers.

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Data are written onto and read from a rapidly rotating recording disk by means of a magnetic head transducer assembly that flies closely over the surface of the disk. Preferably, each face of each disk will have its own independent head.

In a magnetic media, digital information (expressed as combinations of "0's" and "1's") is written on tiny magnetic bits (which themselves are made up of many even smaller grains). When a bit is being written, a magnetic field produced by the disc drive's head orients the bit's magnetization in a particular direction, corresponding to either a 0 or 1. The magnetism in the head in essence "flips" the magnetization in the bit between two stable orientations.

Magnetic thin-film media, wherein a fine grained polycrystalline magnetic alloy layer serves as the active recording medium layer, are generally classified as "longitudinal" or "perpendicular," depending on the orientation of the magnetization of the magnetic domains of the grains of the magnetic material. In longitudinal media (also often referred as "conventional" media), the magnetization in the bits is flipped between lying parallel and anti-parallel to the direction in which the head is moving relative to the disc. In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

Figure 1:
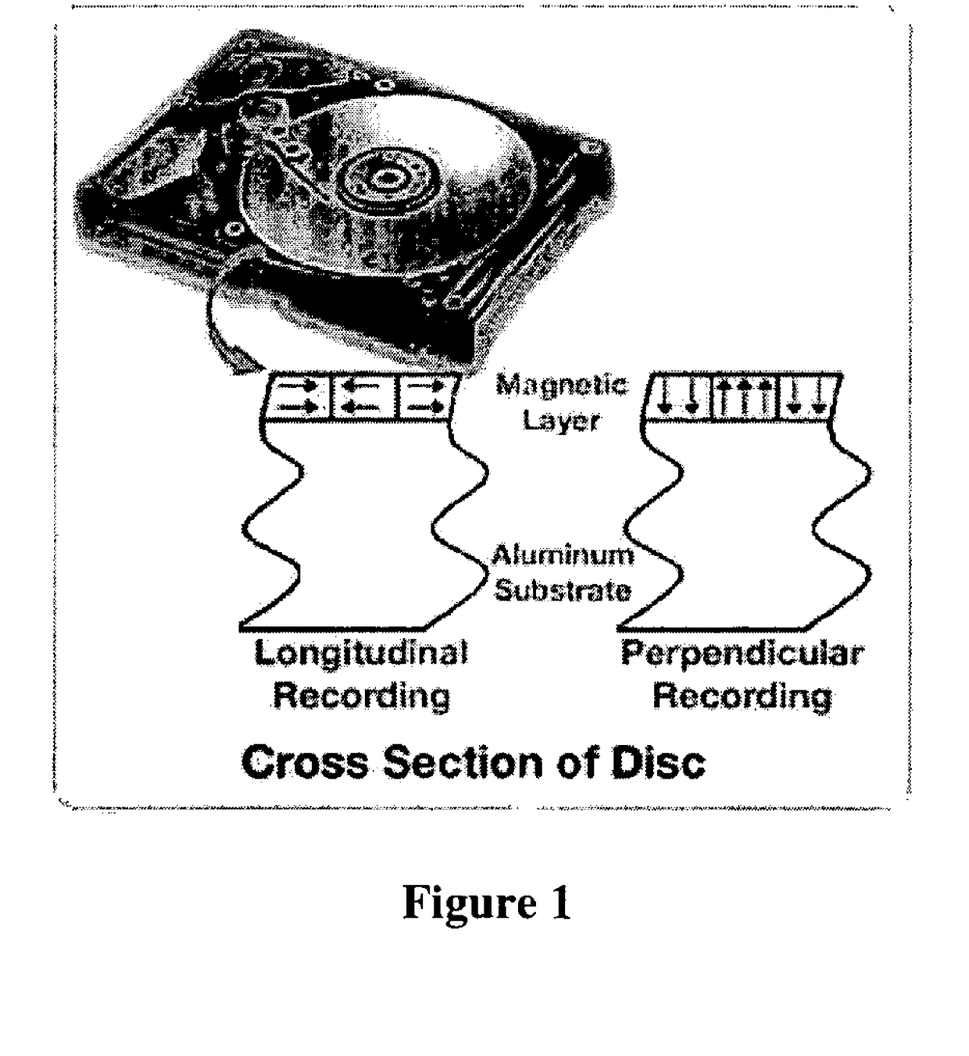
FIG. 1 schematically shows a magnetic disk recording medium comparing longitudinal and perpendicular recording.

FIG. 1 shows a disk recording medium and a cross section of a disc showing the difference between longitudinal and perpendicular recording. Even though FIG. 1 shows one side of the disk, magnetic recording layers are usually sputter deposited on both sides of the non-magnetic aluminum substrate of FIG. 1. Also, even though FIG. 1 shows an aluminum substrate, other embodiments include a substrate made of glass, glass-ceramic, aluminum/NiP, metal alloys, plastic/polymer material, ceramic, glass-polymer, composite materials or other non-magnetic materials.

Efforts are continually being made to increase the areal recording density, i.e., the bit density, or bits/unit area, and signal-to-medium noise ratio (SMNR) of the magnetic media. To continue pushing areal densities and increase overall storage capacity, the data bits must be made smaller and put closer together. However, there are limits to how small the bits may be made. If the bit becomes too small, the magnetic energy holding the bit in place may become so small that thermal energy may cause it to demagnetize over time. This phenomenon is known as superparamagnetism.

Perpendicular recording media are being developed for its capability of extending the areal density to a much higher level without the similar thermal stability limit that longitudinal media are facing. One of the major designs for perpendicular recording media utilizes reactive sputtering the magnetic layer in a gas mixture of oxygen and the popular inert gas Ar, to produce so called granular perpendicular media. The magnetic layer produced by this way has oxide mainly in grain boundaries, which effectively breaks down exchange coupling and results in better recording performance.

The tendency for neighboring magnetic dipoles in a material to line up parallel or antiparallel to each other is called exchange (or exchange coupling). Basically, exchange results from the overlap of orbiting electron on adjacent atoms. The atomic moment of an atom is proportional to the angular momentum of the atom. This angular momentum consists of orbital angular momentum due to the rotation of electrons in their orbits and spin angular momentum (called "spin" for short) which is due to the rotation of electrons about their own axes. If the spin angular momentum of two electrons on neighboring atoms is $s_1$ and $s_2$, then the energy of this pair of electrons, E, is given by $E=-2J\,s_1{}^*s_2$, where J is a constant called the exchange integral. In ferromagnetic materials, J is positive and the moments of adjacent atoms point in the same direction. In antiferromagnetic materials, J is negative. In an antiferromagnetic material, the moments of adjacent atoms point in opposite directions.

Exchange is largely a nearest-neighbor phenomenon that occurs across distances typical of the distance between atoms in a solid (a few angstroms). If there is one atomic boundary layer of one material such as an oxide in grain boundaries, then that may be enough (though thicker boundary layer could also be used) to break down the exchange coupling between the grains separated by the boundary layer. Thus, granular media (i.e., media that grain and have amorphous material such as an oxide and/or voids between crystalline grains) with laminated film structures consisting of laminated soft magnetic layers, seed layers, such as Ag, Au, Cu etc., Ru-alloy inter layers, CoPt-based magnetic recording layers containing oxides, and carbon overcoats have been made and found promising for perpendicular magnetic recording application. However, it has been found that the media coercivity, Hc, and signal-to-media-noise ratio, SMNR, of the prior art perpendicular recording media need to be enhanced significantly for high-density recording applications. This invention relates to perpendicular recording media with enhanced properties for high-density recording.

SUMMARY OF THE INVENTION

This invention relates to a perpendicular recording medium having an interlayer of high-chromium ruthenium-chromium alloy, which significantly enhances coercivity and SMNR. Preferably, the improved lattice match between RuCr inter layers and CoPt-based magnetic recording layers, and the surface energy of RuCr inter layers contribute to the performance improvement with the high-chromium addition into Ru inter layers.

Figure 3:
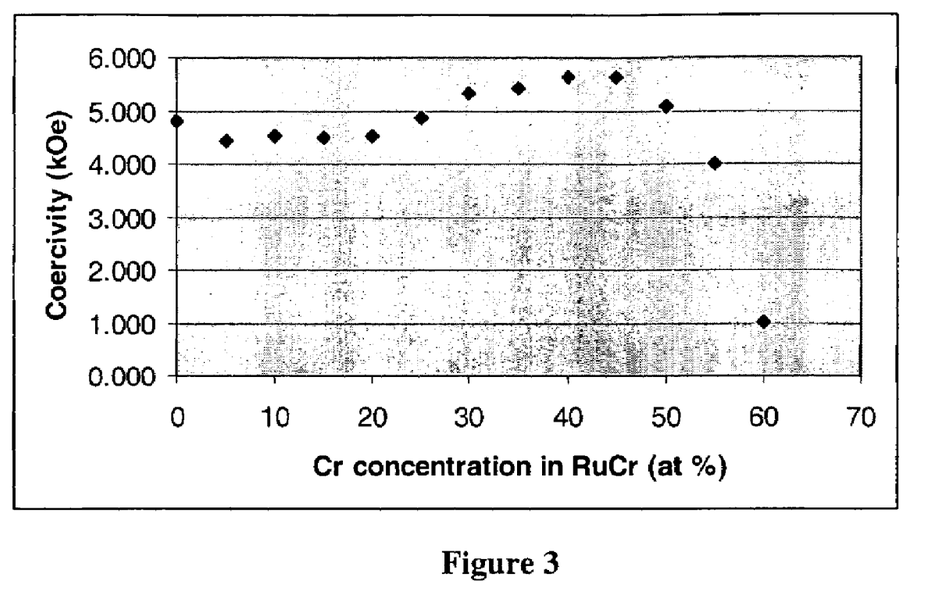
FIG. 3 shows coercivity dependence on Cr concentration in RuCu inter layers.

The present invention relates to perpendicular media with soft magnetic underlayers. The magnetic write field and field gradient at the recording layer of the perpendicular magnetic recording media with soft underlayers can be much higher than the current highest values obtained from the media without soft underlayers. In order to suppress formation of stripe domains and/or reduce the surface roughness of the soft underlayers (SUL), the SUL may be laminated comprising several layers of the soft magnetic materials and with thin spacer layer(s) between the soft magnetic laminations. In order to have high field gradient of the write field generated from the writers of the magnetic heads, the distance between the heads and the soft magnetic layers should be as short as possible. Therefore, the present media comprise Ru-alloy inter layers directly deposited on thin (less than 3 nm) seed layers, which are directly deposited on amorphous or nanocrystalline soft magnetic underlayers, which provide proper surface for very thin seed layers and Ru-alloy inter layers to grow on and to develop nice crystallographic structure of Ru-alloy inter layers. The FWHM (full width at half maximum) of XRD rocking curves of RuCr/CoPt-alloy (0002) peaks of media with Cu seed layers and with Ru-25 at % Cr inter layers shown on FIG. 3 is 2.65 degree, which demonstrates the very good crystallographic orientation of the media according with the current invention. The Ru-alloy inter layers used for this kind of perpendicular media do not have epitaxial relationship with seed layers. Suitable lattice matching of Ru-alloy inter layers with CoPt-based magnetic recording layers is required for good magnetic media. RuCr inter layers with Cr in the range of 15 to 50 at % satisfy the requirements.

The addition of oxides or nitrides, such as $SiO_2$, $TiO_2$, $Ta_2O_5$, $Al_2O_3$, $Nb_2O_5$, into magnetic recording layers could improve the performance of the CoPt magnetic alloy films by effective segregation and grain de-coupling.

One embodiment is a perpendicular magnetic recording medium comprising a substrate, a soft magnetic underlayer, a seedlayer directly on the soft magnetic underlayer, a $RuCr_x$-containing interlayer having $15 \leq x \leq 50$ on the seedlayer and a magnetic recording layer in this order. Preferably, the magnetic recording layer is a $SiO_2$-containing magnetic layer and the medium is a granular medium. Preferably, the seedlayer is less than 3 nm thick and comprises a face-centered cubic structure and the $RuCr_x$-containing interlayer is directly on the seedlayer. Preferably, the magnetic recording layer comprises Pt and Co, and other combinations of B, Cr, Co, Pt, Ni, Ta, Nb, Al, Si, Zr, Hf, W, C, Mo, Ru, O and N. More preferably, the soft underlayer has laminated structure with spacer layer(s) between the laminations of the soft underlayers. In one variations, the soft underlayer is substantially amorphous or nanocrystalline. Preferably, the interlayer comprises a dual interlayer structure with the $1^{st}$ and the $2^{nd}$ $RuCr_x$-containing interlayers both having $15 \leq x \leq 50$ and having hexagonal close-packed structure, and the $2^{nd}$ interlayer comprises a structure with separated column grains, wherein the $1^{st}$ $RuCr_x$-containing interlayer is directly deposited on the seed layer, and the $2^{nd}$ $RuCr_x$-containing interlayer is directly under the magnetic recording layer.

Another embodiment is a method of manufacturing a perpendicular recording medium comprising obtaining a substrate, depositing a soft magnetic underlayer, depositing a seedlayer directly on the soft magnetic underlayer, depositing a $1^{st}$ $RuCr_x$-containing interlayer under a first gas pressure and depositing a $2^{nd}$ $RuCr_x$-containing interlayer under a second gas pressure, the $1^{st}$ and $2^{nd}$ $RuCr_x$-containing interlayers having $15 \leq x \leq 50$ on the seedlayer and the first gas pressure being lower than the second gas pressure and preferably further comprising depositing a magnetic recording layer comprising Pt and Co, and other combinations of B, Cr, Co, Pt, Ni, Ta, Nb, Al, Si, Zr, Hf, W, C, Mo, Ru, O and N, wherein the magnetic recording layer contains about 1 to 12 mol. % $SiO_2$. Preferably, the $1^{st}$ $RuCr_x$-containing interlayer has substantially no epitaxial relationship with the seedlayer that preferably comprises a material selected from the group consisting of Cu, Ag, Au, Pt, Pd and combinations thereof. In one variation, the $1^{st}$ $RuCr_x$-containing interlayer is directly on the seedlayer and preferably the magnetic recording layer comprises CoCrPt—$SiO_2$. In another variation, the soft underlayer has laminated structure with spacer layer(s) between the laminations of soft underlayers. Preferably, the order of layers is the substrate, the laminated soft underlayer with spacer layer(s) between the laminations of the soft underlayers, the seedlayer, the $1^{st}$ $RuCr_x$-containing interlayer, the $2^{nd}$ $RuCr_x$-containing interlayer and the magnetic recording layer, wherein the magnetic recording layer is a oxides or nitrides-containing magnetic layer, wherein the $1^{st}$ and $2^{nd}$ $RuCr_x$-containing interlayers have $25 \leq x \leq 50$.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 2:
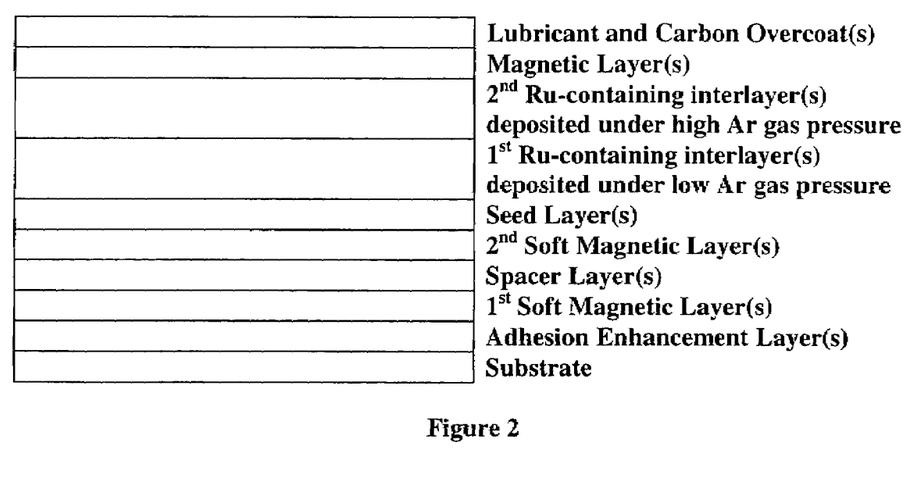
FIG. 2 is an example of the film structure of the magnetic recording media in accordance with the present invention.

This invention relates to a perpendicular recording medium having a substrate, soft underlayer(s), seed layer(s), interlayer(s), and a magnetic recording layer comprising grains. Preferably, the magnetic recording layer has substantial oxides or nitrides, such as $SiO_2$, which could be within and/or between the grains. The media could be made by sputter depositing the magnetic recording layer in a chamber containing a gas mixture of argon and oxygen or nitrogen under vacuum, or by sputtering magnetic targets comprising oxides or nitrides in a chamber containing argon or a gas mixture of argon and oxygen or nitrogen FIG. 2 shows a simplified cross-sectional view of an embodiment of this invention. All samples of the granular media disclosed here were fabricated with Intevac MDP 250 B+ sputter machine on Al substrates, optionally having a NiP-coating. The laminated films were deposited under ambient temperature with DC (direct current) magnetron sputtering except for the carbon overcoats were deposited with ion beam deposition. The granular media comprise, from the bottom to the top of the laminated films, 3 nm Ti adhesion enhancement layers, 80 nm $FeCo_{30.8}B_{12}$ soft magnetic layers (SUL1), 2.5 nm Ta spacer layers, 80 nm $2^{nd}$ $FeCo_{30.8}B_{12}$ soft magnetic layers (SUL2), 2 nm Cu seed layers or 1.5 nm Ag seed layers, 9 nm $1^{st}$ Ru-alloy inter layers (IL1) deposited under 3.6 mTorr of Ar gas pressure, 9 nm $2^{nd}$ Ru-alloy inter layers (IL2) deposited under high Ar gas pressure, 10.4 nm $CoCrPtSiO_2$ magnetic layer deposited under about 33 mTorr of gas mixture of argon and oxygen, and 3 nm carbon. The composition of $CoCrPtSiO_2$ targets in molecular/atomic percent is preferably 72, 6, 18, and 4 respectively for Co, Cr, Pt and $SiO_2$. The number of the layers shown here is illustrative but not restrictive.

The $1^{st}$ interlayer deposited under low gas pressure features HCP (hexagonal close-packed)-structured interlayer that enables good crystallographic orientations of the interlayers and magnetic recording layers (narrow FWHM of x-ay diffraction rocking curves around (0002) peaks). The $2^{nd}$ interlayer deposited under high gas pressure features well separated column grain structure, so the magnetic grains epitaxially grown on the interlayers also feature well separated column grain structure for reduced granular magnetic exchange coupling. The composition of the $1^{st}$ and the $2^{nd}$ interlayers is not limited to any specific one.

Instead of the optional NiP coating on the substrate, the layer on the substrate could be any Ni-containing layer such as a NiNb layer, a Cr/NiNb layer, or any other Ni-containing layer. Optionally, there could be an adhesion layer between the substrate and the Ni-containing layer. The surface of the Ni-containing layer could be optionally oxidized.

The present invention relates to perpendicular media with soft magnetic underlayers. In order to have high field gradient of the write field generated from the writers of the magnetic heads, the distance between the heads and the soft magnetic layers should be as short as possible. Therefore, the present media comprise Ru-alloy inter layers directly deposited on thin (less than 3 nm) seed layers, which are directly deposited on amorphous or nanocrystalline soft magnetic underlayers, which provide proper surface for very thin seed layers and Ru-alloy inter layers to grow on and to develop a proper crystallographic structure of Ru-alloy inter layers. The FWHM of XRD rocking curves around Ru/Co (0002) peaks of the perpendicular magnetic recording media according to the current invention is less than 3 degrees. The narrower it is, the better the media performance is.

The FWHM (full width at half maximum) of XRD (X-ray diffraction) rocking curves of RuCr/CoPt-alloy (0002) peaks of media with Cu seed layers and with Ru-25 at % Cr inter layers shown in FIG. 3 is 2.65 degree, which demonstrates the very good crystallographic orientation of the media of this invention. The Ru-alloy inter layers used for the perpendicular media of this invention preferably do not have epitaxial relationship with seed layers. Suitable lattice matching of Ru-alloy inter layers with CoPt-based magnetic recording layers is required for good magnetic media. The lattice mismatch between Ru-alloy interlayers and CoPt-based magnetic recording layers can be calculated with equation (1) below, $$\text{mismatch} = (a_r - a_c)/a_c \quad (1)$$

where $a_r$ and $a_c$ is "a" lattice parameter of the HCP structure of Ru-alloy interlayer and CoPt-based magnetic layer respectively. The mismatch of less than 5% is required. RuCr inter layers with Cr in the range of 15 to 50 at % satisfy the requirements.

The substrates used can be Al alloy, glass, or glass-ceramic. The magnetically soft underlayers according to present invention are amorphous or nanocrystalline and can be FeCoB, FeCoC, FeCoTaZr, FeTaC, FeSi, CoZrNb, CoZrTa, etc. The seed layers can be Cu, Ag, Au, Pt, Pd, etc. The CoPt-based magnetic recording layers can be CoPt, CoPtCr, CoPtCrTa, CoPtCrB, CoPtCrNb, CoPtTi, CoPtCrTi, CoPtCrSi, CoPtCrAl, CoPtCrZr, CoPtCrHf, CoPtCrW, CoPtCrC, CoPtCrMo, CoPtCrRu, etc., deposited under argon gas, or under the gas mixture of argon and oxygen or nitrogen. Oxides or nitrides can be incorporated into the target materials also.

Embodiments of this invention include the use of any of the various magnetic alloys containing Pt and Co, and other combinations of B, Cr, Co, Pt, Ni, Al, Si, Zr, Hf, W, C, Mo, Ru, Ta, Nb, O and N, in the magnetic recording layer. In a preferred embodiment, the magnetic recording layer is Co—Cr—Pt—$SiO_2$. In another embodiment, the Co—Cr—Pt—$SiO_2$ comprises at least 0–20 atomic percent Cr, 6 to 22 atomic percent Pt, 1 to 12 molecular percent $SiO_2$, and Co in the balance.

In a preferred embodiment the total thickness of SUL1 and SUL 2 is 1000 to 4000 Å, and more preferably 1500 to 2500 Å. There could be a third soft under layer (SUL3) and a fourth soft underlayer (SUL4) etc., wherein the total thickness of SUL1, 2, 3, and 4 etc is 1000 to 4000 Å, and more preferably 1500 to 2500 Å. The laminations of the SUL can have identical thickness or different thickness. The spacer layers between the laminations of SUL could be Ta, C, etc. with thickness between 10 and 50 Å. The thickness of the seed layer, $t_s$, is in the range of 5 Å$<t_s<$30 Å. The thickness of IL1 or IL2 is 10 to 500 Å, and more preferably 10 to 200 Å, and the total thickness of IL1 and IL2 is 20 to 510 Å, and more preferably 40 to 200 Å. The thickness of the magnetic recording layer is about 50 Å to about 300 Å, more preferably 80 to 150 Å. The adhesion enhancement layers of the SUL could be Ti, TiCr, Cr etc. with thickness of 10 to 50 Å. The overcoat could be hydrogenated, nitrogenated, hybrid or other forms of carbon with thickness of 10 to 80 Å, and more preferably 30 to 60 Å.

The magnetic recording medium has a remanent coercivity of about 2000 to about 10,000 Oersted, and an $M_r t$ (product of remanance, Mr, and magnetic recording layer thickness, t) of about 0.2 to about 2.0 memu/cm². In a preferred embodiment, the coercivity is about 2500 to about 9000 Oersted, more preferably in the range of about 4000 to about 8000 Oersted, and most preferably in the range of about 4000 to about 7000 Oersted. In a preferred embodiment, the $M_r t$ is about 0.25 to about 1 memu/cm², more preferably in the range of about 0.4 to about 0.9 memu/cm².

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

Each of the layers constituting magnetic recording media of the present invention, except for a carbon overcoat and a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The carbon overcoat is typically deposited with sputtering or ion beam deposition. The lubricant layer is typically provided as a topcoat by dipping of the medium into a bath containing a solution of the lubricant compound, followed by removal of excess liquid, as by wiping, or by a vapor lube deposition method in a vacuum environment.

Sputtering is perhaps the most important step in the whole process of creating recording media. There are two types of sputtering: pass-by sputtering and static sputtering. In pass-by sputtering, disks are passed inside a vacuum chamber, where they are deposited with the magnetic and non-magnetic materials that are deposited as one or more layers on the substrate when the disks are moving. Static sputtering uses smaller machines, and each disk is picked up and deposited individually when the disks are not moving. The layers on the disk of FIG. 2 were deposited by static sputtering in a sputter machine.

The sputtered layers are deposited in what are called bombs, which are loaded onto the sputtering machine. The bombs are vacuum chambers with targets on either side. The substrate is lifted into the bomb and is deposited with the sputtered material.

A layer of lube is preferably applied to the carbon surface as one of the topcoat layers on the disk.

Sputtering leads to some particulates formation on the post sputter disks. These particulates need to be removed to ensure that they do not lead to the scratching between the head and substrate. Once a layer of lube is applied, the substrates move to the buffing stage, where the substrate is polished while it preferentially spins around a spindle. The disk is wiped and a clean lube is evenly applied on the surface.

Subsequently, in some cases, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the disk.

EXAMPLES

FIG. 3 shows coercivity dependence on Cr concentration in RuCr inter layers of the granular media with Cu seed layers and with the $2^{nd}$ RuCr layers deposited under 30 mTorr and with the magnetic recording layers deposited under 0.5 volume % of oxygen. RuCr films were deposited with co-sputtering of two concentric ring/disc-shaped targets with Cr targets located at the center position of these two ring/disc-shaped targets. Film magnetic property was measured with a Kerr magnetometer. The media with RuCr inter layers of 25 to 50 at % of Cr show higher coercivity than the media with pure Ru inter layers and with RuCr inter layers of low Cr content. Table I lists the data, which are plotted on FIG. 3.

TABLE I

Coercivity dependence on Cr concentration in RuCr inter layers.

| | Cr at % | | | | | | | | | | | | |
|---|---|---|---|---|---|---|---|---|---|---|---|---|---|
| | 0 | 5 | 10 | 15 | 20 | 25 | 30 | 35 | 40 | 45 | 50 | 55 | 60 |
| Hc (kOe) | 4.794 | 4.439 | 4.526 | 4.505 | 4.536 | 4.85 | 5.316 | 5.423 | 5.622 | 5.624 | 5.062 | 4.013 | 1.027 |

Figure 4:
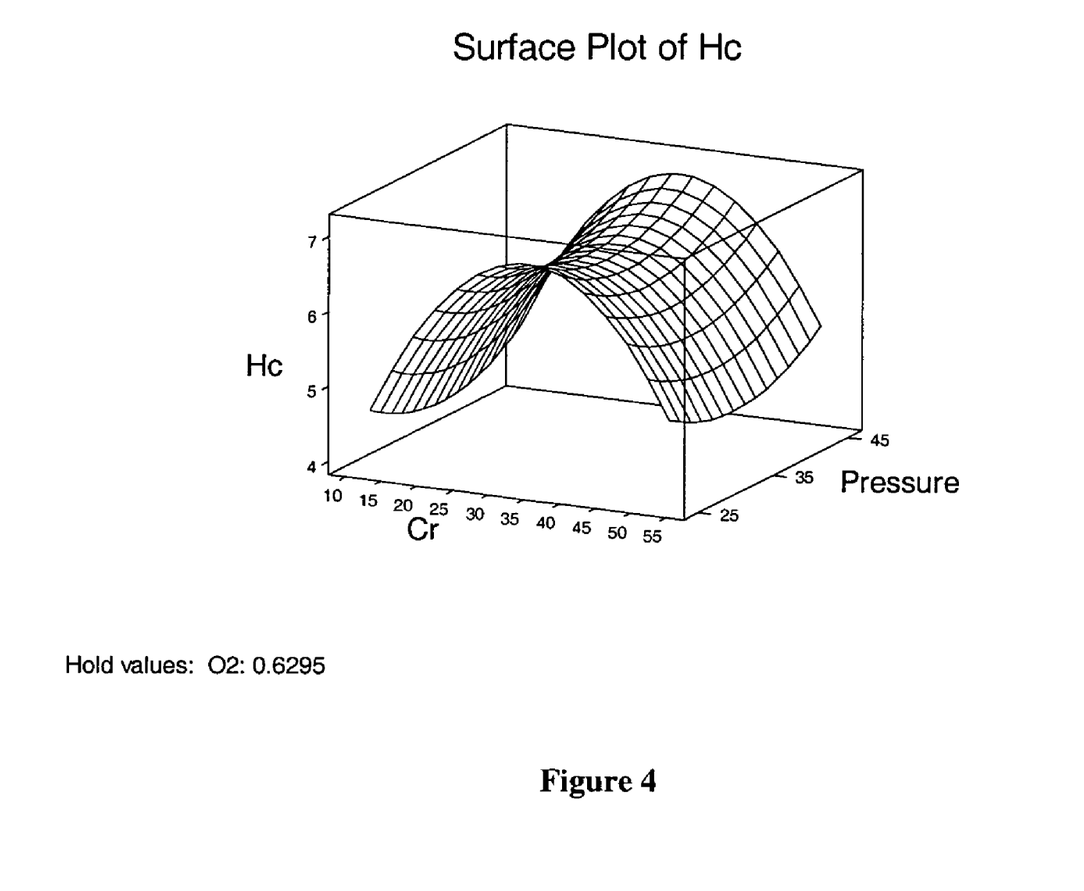
FIG. 4 shows surface plot of Hc (in kOe) versus Cr concentration in RuCr (at %) and gas pressure (mTorr) for $2^{nd}$ layer of RuCr deposition. The oxygen content in the gas for magnetic recording layer deposition is 0.6295 volume %.
Figure 5:
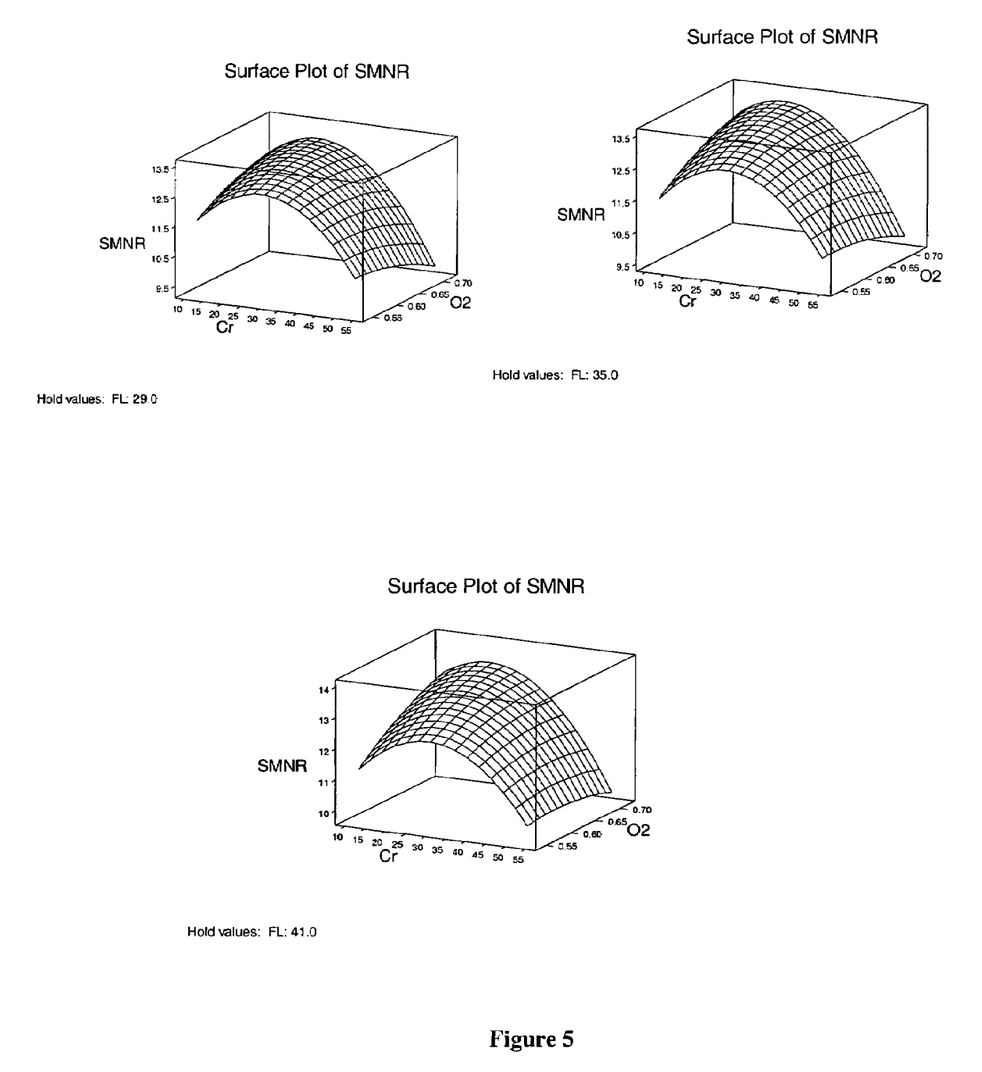
FIG. 5 shows surface plots of SMNR (in dB) versus Cr concentration in RuCr (at %) and oxygen content in the gas for magnetic recording layer deposition (volume %) under 29 (top left figure), 35 (top right figure), and 41 (bottom figure) mTorr as the gas pressure for $2^{nd}$ layer of RuCr deposition.
Figure 9:
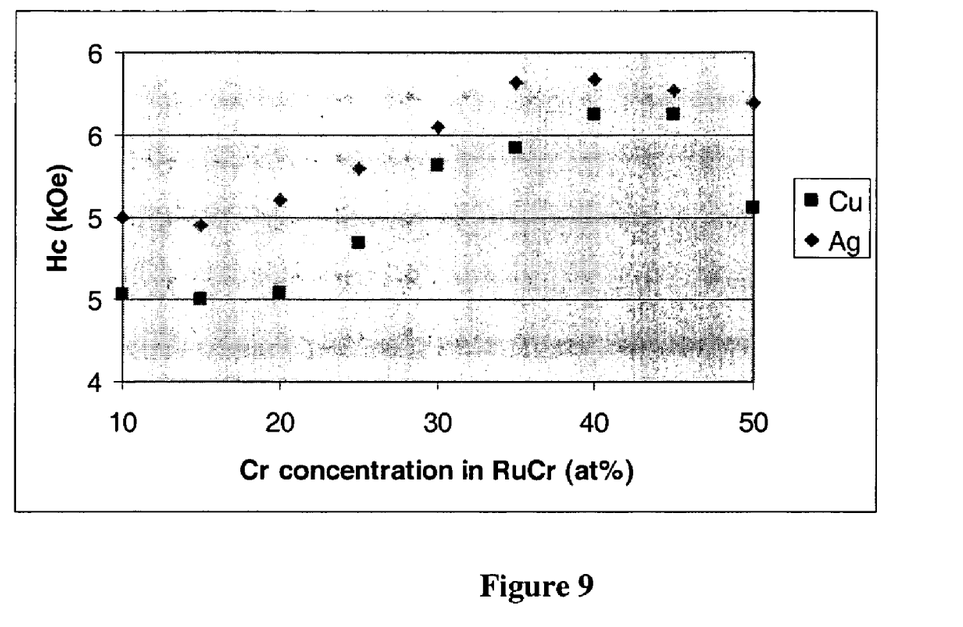
FIG. 9 shows the coercivity (Hc) dependence on atomic percentage of chromium in RuCr inter layers, which were deposited on Ag or Cu seed layers.

Design of experiment (DOE) was conducted utilizing Minitab program. A central composite design with three factors, Cr concentration in RuCr inter layers, gas pressure for $2^{nd}$ RuCr inter layer deposition, and oxygen content in the gas for magnetic recording layer deposition, was conducted. FIG. 4 and FIG. 5 show the surface plots of Hc and SMNR. The RuCr inter layers were deposited with co-sputtering of two concentric ring-shaped targets with Ru targets located at the inner position of these ring-shaped targets. The figures demonstrate that the granular perpendicular magnetic recording media with Cu seed layers and with RuCr inter layers of Cr content between 15 to 50 at % have high coercivity and SMNR. SMNR was measured with magnetic heads with single-pole writers and GMR (giant magnetoresistive) readers and tested under 700 KFCI (thousand flux reversals per inch). Similar results were observed for the media with Ag seed layers also. FIG. 9 shows coercivity dependence on Cr concentration in RuCr inter layers for the media with Cu and Ag seed layers respectively. The media with Cu seed layers are the same media shown on FIG. 3. The media with Ag seed layers were deposited under otherwise identical conditions with the media with Cu seed layers except for 1.5 nm Ag seed layers were used instead of Cu seed layers.

Both Ag and Cu films are FCC (face-centered cubic)-structured. But their lattice constants are quite different. The distance between neighboring atoms on (0002) planes of bulk Ru and Co-20 at % Pt, $CoPt_{20}$, is 2.71 and 2.56 Å respectively. The distance between neighboring atoms on (111) planes of bulk Ag and Cu is 2.89 Å, higher than that of Ru, and 2.55 Å, much smaller than that of Ru, respectively. The lattice constant of $CoCr_6Pt_{18}$ is slightly smaller than that of $CoPt_{20}$ due to less Pt content. The similar response of magnetic property, recording performances, and crystallographic orientation characteristics, such as FWHM of XRD rocking curves of RuCr (0002) peaks, on Cr concentration in RuCr layers of the media on Ag and Cu seed layers suggests that there is not epitaxial growth of RuCr inter layers on the seed layers. The lattice match between RuCr inter layers and CoPt-based recording layers, and the stress state at the interface of these two layers play a significant role on magnetic and recording performances of the perpendicular recording media.

Figure 6:
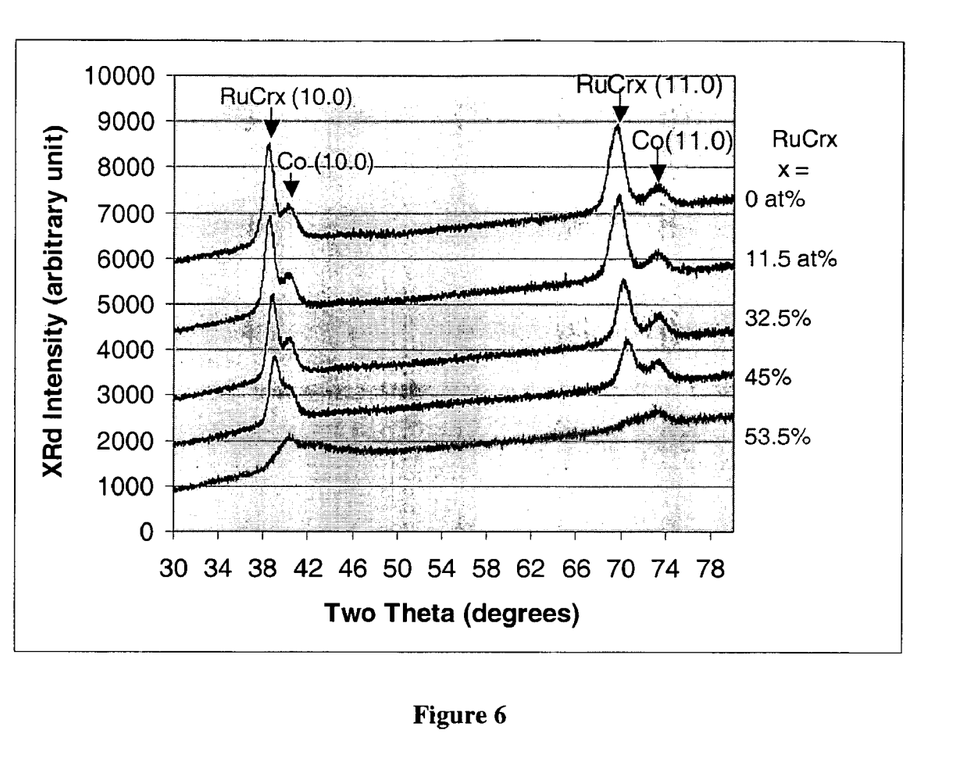
FIG. 6 shows gracing angle theta-two theta XRD profiles of perpendicular magnetic recording media with varying Cr concentration in RuCr.

FIG. 6 shows gracing angle theta-two theta XRD (X-ray diffractometry) curves of granular perpendicular media with Cu seed layers and with varying Cr concentration in RuCr inter layers. As Cr content increases, RuCr (10.0) and (11.0) peak positions move towards Co (10.0) and (11.0) positions respectively. As Cr content increases, lattice match between RuCr inter layers and CoPt-based magnetic layers is improved. When Cr content is too high, for instance, more that 52 at %, RuCr is not HCP (hexagonal close-packed) structure anymore. The XRD curve of media with 53.5 at % of Cr in RuCr inter layers supports this argument. There is a preferred Cr concentration range affected by lattice match, interface stress status, surface energy and RuCr crystallinity. The preferred Cr concentration in RuCr inter layers is 15 to 50 at %. The RuCr inter layers are directly in contact with seed layers at the bottom and CoPt-based magnetic recording layers at the top. The thickness of the RuCr inter layers can be 2 nm to 51 nm.

The curves of FIG. 6 were obtained using $RuCr_x$ inter layers and CoPt-magnetic layers. When x was 53.5%, $RuCr_{53.5}$ did not produce any diffraction pattern and so the pattern produced was that primarily due to CoPt-magnetic layers.

COMPARATIVE EXAMPLES

Figure 7:
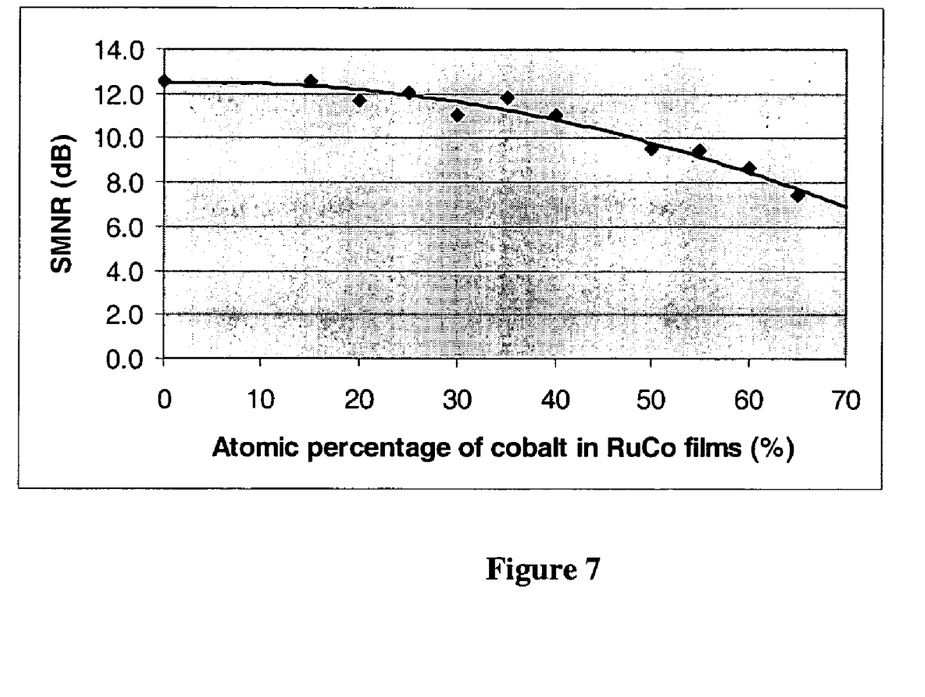
FIG. 7 shows the dependence of media signal-to-noise ratio (SMNR) on atomic percentage of cobalt in RuCo inter layers.

Cobalt has similar atomic volume as chromium. FIG. 7 shows that the SMNR of granular media with Cu seed layers decreases as cobalt content in the RuCo inter layers increases. Cobalt addition into Ru films would have had similar effect as Cr, if the effect were due to the lattice match only. The effect of the additives on surface energy of Ru-alloy inter layers also plays an important role. The surface smoothness of the Ru-alloy inter layers, especially of the 1$^{st}$ Ru-alloy inter layers plays an important role in controlling crystallographic orientations of magnetic recording layers.

Figure 8:
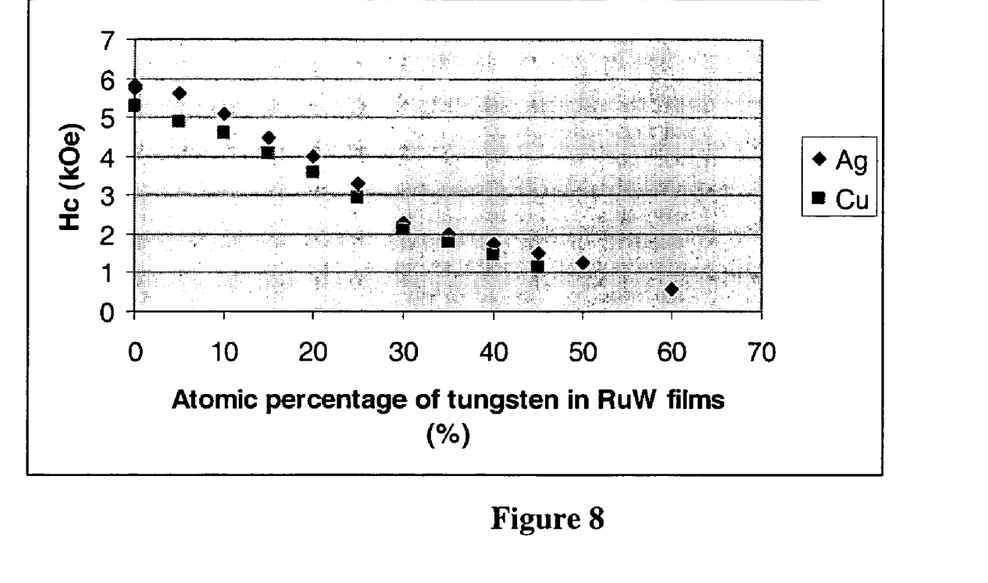
FIG. 8 shows the coercivity (Hc) dependence on atomic percentage of tungsten in RuW inter layers, which were deposited on Ag or Cu seed layers.

FIG. 8 shows coercivity, Hc, dependence on tungsten content in RuW inter layers. Coercivity monotonically decreases as tungsten content increases. Tungsten addition into the Ru-alloy inter layers appears to worsen the lattice matching between Ru-alloy inter layers and $CoCr_6Pt_{18}$ $(SiO_2)_4$ magnetic layers. Tungsten has much bigger atomic volume than Cu, Ru, Co and Pt, but still much smaller than that of Ag and Au. Because lattice matching between Ru-alloy inter layers and seed layers would be an important factor in affecting film magnetic properties, media with certain amount of tungsten in the RuW inter layers and with Ag seed layers should have had improved magnetic properties than media with Ru inter layers. Yet, this invention proved just the opposite.

This application discloses several numerical ranges in the text and figures. The numerical ranges disclosed support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A perpendicular magnetic recording medium comprising a substrate, a soft magnetic underlayer, a Cu-containing seedlayer directly on the soft magnetic underlayer, a $RuCr_x$-containing interlayer having $15 \leq x \leq 50$ on the seedlayer and a magnetic recording layer in this order, wherein the soft underlayer has a laminated structure with spacer layer(s) between laminations of the soft underlayers.

2. The medium of claim 1, wherein the magnetic recording layer is a $SiO_2$-containing magnetic layer.

3. The medium of claim 1, wherein the medium is a granular medium.

4. The medium of claim 1, wherein the seedlayer is less than 3 nm thick and comprises a face-centered cubic structure.

5. The medium of claim 1, wherein the $RuCr_x$-containing interlayer is directly on the seedlayer.

6. The medium of claim 1, wherein magnetic recording layer comprises Pt and Co, and at least one other element listed in the group consisting of B, Cr, Co, Pt, Ni, Ta, Nb, Al, Si, Zr, Hf, W, C, Mo, Ru, O and N.

7. The medium of claim 1, wherein the soft underlayer is substantially amorphous or nanocrystalline.

8. The medium of claim 1, wherein the interlayer comprises a dual interlayer structure with the 1$^{st}$ and the 2$^{nd}$ $RuCr_x$-containing interlayers both having $15 < x < 50$ and having hexagonal close-packed structure, and the 2$^{nd}$ interlayer comprises a structure with separated column grains.

9. The medium of claim 8, wherein the 1$^{st}$ $RuCr_x$-containing interlayer is directly deposited on the seed layer, and the 2$^{nd}$ $RuCr_x$-containing interlayer is directly under the magnetic recording layer.

10. The medium of claim 1, wherein the Cu-containing seedlayer has a thickness of less than 3 nm.

11. The medium of claim 1, wherein the $RuCr_x$-containing interlayer does not have an epitaxial relationship with the Cu-containing seedlayer.

12. The medium of claim 1, wherein the FWHM (frill width at half maxium) of a XRD rocking curve of the $RuCr_x$-containing interlayer and the magnetic layer containing CoPt-alloy is 2.65.

13. The medium of claim 1, wherein the $RuCr_x$-containing interlayer has a HCP structure, and further wherein the $RuCr_x$-containing interlayer and the magnetic layer have a mismatch of less than 5%.

* * * * *